US008003196B2

(12) United States Patent
Tokumoto et al.

(10) Patent No.: US 8,003,196 B2
(45) Date of Patent: Aug. 23, 2011

(54) DECORATIVE MATERIAL

(75) Inventors: Naoki Tokumoto, Kashiwa (JP); Takeshi Nakamura, Kashiwa (JP)

(73) Assignee: Toppan Cosmo, Inc. (JP)

( * ) Notice: Subject to any disclaimer, the term of this patent is extended or adjusted under 35 U.S.C. 154(b) by 11 days.

(21) Appl. No.: 12/018,738

(22) Filed: Jan. 23, 2008

(65) Prior Publication Data

US 2008/0241481 A1 Oct. 2, 2008

(30) Foreign Application Priority Data

Apr. 2, 2007 (JP) ................................ P2007-096366

(51) Int. Cl.
*B32B 3/00* (2006.01)
*B32B 7/14* (2006.01)
*B32B 5/16* (2006.01)

(52) U.S. Cl. ..... 428/172; 428/156; 428/167; 428/195.1; 428/203; 428/204; 428/913.3; 428/542.2

(58) Field of Classification Search .................. 428/156, 428/167, 172, 195.1, 204, 207, 203, 913.3, 428/542.2
See application file for complete search history.

(56) References Cited

U.S. PATENT DOCUMENTS 6,852,399 B2 * 2/2005 Takahashi et al. ............ 428/213
2006/0269727 A1 * 11/2006 Sugita et al. ............... 428/195.1
2008/0075966 A1 * 3/2008 Mori et al. ................. 428/542.2

FOREIGN PATENT DOCUMENTS

JP 3629964 B 2/2000
JP 2004300407 A * 10/2004

OTHER PUBLICATIONS

Mori et al., U.S. Appl. No. 11/690,605, Filed Mar. 23, 2007, 30 pages.

* cited by examiner

*Primary Examiner* — David R Sample
*Assistant Examiner* — Catherine Simone
(74) *Attorney, Agent, or Firm* — St. Onge Steward Johnston & Reens LLC

(57) ABSTRACT

The present invention provides a decorative material that represents recesses and protrusions by means of difference in the state of luster of the surface, and does not allow an oily substance to infiltrate and remain therein.

2 Claims, 1 Drawing Sheet

DECORATIVE MATERIAL

CROSS-REFERENCE TO RELATED APPLICATIONS

The present application claims priority of Japanese Patent Application No. 2007-096366, filed on Apr. 2, 2007, the contents of which are incorporated herein by reference.

FIELD OF THE INVENTION

The present invention relates to a decorative material used to provide an aesthetic effect on the surface of the interior and/or exterior of a building, joinery, furniture, etc. Particularly, the present invention relates to a decorative material which, in the case of a surface having a wood grain pattern, for example, provides a three-dimensional impression of recesses and protrusions of vessels by means of difference in the level of luster on the surface.

BACKGROUND OF THE INVENTION

To produce recesses and protrusions on a decorative material that has been used in knock-down furniture, a building material, furniture or the like, there is such a method that provides a visual effect of a three-dimensional impression of recesses or protrusions by differentiating the level of the state of luster between portions to be seen as protruding or portions to be seen as recessed on the surface so as to take advantage of the visual illusion of human recognition, instead of forming real recesses and protrusions on the decorative material. This method causes a portion having higher luster to be seen as if protruding and a portion having lower luster to be seen as if recessed by the human eye, when in fact there is no are recesses and protrusions.

The above-mentioned method is implemented, for example, by forming a luster control layer, from a transparent or semi-transparent synthetic resin paint having a controlled state of luster, over the entire surface of a substrate whereon an appropriate design including a recess pattern is printed, then forming a transparent or semi-transparent layer of an ionizing radiation-curable resin having a different luster level on a portion of the surface of the luster control layer except for the portion where the recess pattern or protrusion pattern is formed. The luster control layer and the layer of an ionizing radiationcurable resin include silica particles added for the purpose of adjusting the luster level and/or improving scratch resistance.

This method enables the rendering of a three-dimensional impression of recesses and protrusions to any substrate simply by providing the luster control layer and the layer of an ionizing radiation-curable resin having different luster levels, without using any special chemical. In addition, since the layers having different luster levels can be formed by a common printing method such as gravure printing after forming the design pattern, no special facility is required so that the process can be carried out with high productivity and matching with the design pattern can be easily achieved. Also because the paint layer can be far thinner than the height difference between the recesses and protrusions to be represented, consumption of the resin can be decreased and higher flexibility is achieved so that a decorative material having an excellent property on bending processing can be easily provided. Also because the decorative material does not have significant surface irregularities, there is such an advantage that stains do not accumulate in recesses.

Due to the many advantages described above, the decorative material based on the above-mentioned method has been used in large quantities, but has not yet excelled in a method of actually forming a high quality of recesses and protrusions. The reason can be considered as follows. A mechanical embossing method, for example, is capable of representing the configuration of the recesses and protrusions such as vessels of natural wood accurately including the sectional configuration. With this method that uses two kinds of paints having different luster levels, in contrast, surface luster is provided in two levels and therefore recesses and protrusions that can be represented are also provided in two levels. As a result, there is a problem that this method is not capable of representing the configuration of recesses and protrusions having slopes where depth (height) changes continuously as in the case of vessels of natural wood.

Accordingly, such a decorative material has been proposed (see, for example, Japanese Patent No. 3,629,964) that represents the configuration of recesses and protrusions having slopes where depth (height) changes continuously as in the case of vessels of natural wood, by providing a luster control layer that represents the configuration of recesses and protrusions having slopes where a depth (height) changes continuously.

However, the decorative material disclosed in Japanese Patent No. 3,629,964 has such a problem as containing silica particles therein for the purpose of adjusting the luster level and/or improving scratch resistance makes it easier for an oily substance such as paraffin oil or butter to infiltrate into the decorative material. An oily substance that has infiltrated may be removed, if it remains near the surface, by sucking out or wiping out. However, a stain that has infiltrated down to the substrate is difficult to remove, so as to remain therein thus giving rise to the possibility of ply separation and impairing the appearance.

SUMMARY OF THE INVENTION

The present invention has been devised to solve the problems described above, with an object of providing a decorative material that represents three-dimensional expression of recesses and protrusions by means of difference in the state of luster of the surface, and prevents the oily substance from infiltrating and staying therein.

In order to solve the problems described above, the present invention proposes the following means.

The decorative material of the present invention comprises a substrate, a solid print layer that is formed from an oil resistant ink and covers the upper layer side of the substrate, a design pattern that is provided on the upper layer side than the solid print layer and corresponds to an expression region representing recesses or protrusions, a first luster control layer that is formed from a mixture of a curable resin and isocyanate resin with silica particles contained therein and covers the design pattern and the lower layer of the design pattern, and a second luster control layer containing silica particles and is provided with a state of luster different from that of the first luster control layer, while having a gradation region where the state of luster is changed stepwise in the vicinity of the outline of the design pattern excluding the portion directly above the design pattern.

The decorative material of the present invention represents recesses and protrusions by means of two layers, the first luster control layer and the second luster control layer, that are controlled to have different states of luster by means of the silica particles contained therein, and provides stepwise gradation of the state of luster by the gradation region. Should an oily substance infiltrate into the second luster control layer and the first luster control layer, the oily substance is prevented from infiltrating into the substrate since the solid print layer is formed from the oil resistant ink so as to cover the substrate below the design pattern.

In the decorative material described above, the oil resistant ink used to form the solid print layer preferably contains an acrylpolyol resin having a weight average molecular weight in a range from 10,000 to 80,000 as a binder resin and 10% by weight to 75% by weight of pigment.

The decorative material of the present invention effectively prevents an oily substance from infiltrating into the substrate by forming the solid print layer from such an oil resistant ink as described above.

In the decorative material described above, an acrylpolyol resin contained in the oil resistant ink that forms the solid print layer preferably has a hydroxyl value of 4.0 mg KOH/g or more and 30.0 mg KOH/g or less.

The decorative material of the present invention is capable of effectively demonstrating oil resistance as the oil resistant ink has a hydroxyl value of 4.0 mg KOH/g or more, and allows the pigment to disperse properly as the oil resistant ink has a hydroxyl value of 30.0 mg KOH/g or less.

It is more preferable that the decorative material has a surface pattern formed from an oil resistant ink on the first luster control layer directly above the design pattern.

Forming the surface pattern on the decorative material of the present invention enables the provision of a design that is recognized as a color pattern, independent from the recesses and protrusions provided in the gradation region. Forming the surface pattern from an oily ink also enables the prevention of an oily substance from infiltrating into the area from which the second luster control layer has been removed.

In the decorative material of the present invention, covering the substrate with the solid print layer formed from the oil resistant ink enables effective representation of a three-dimensional impression of recesses and protrusions by means of difference in the state of luster of the surface, while preventing oil from infiltrating into the substrate to stay therein thereby giving rise to the possibility of ply separation and impairing the appearance.

DETAILED DESCRIPTION OF THE INVENTION

Figure 1:
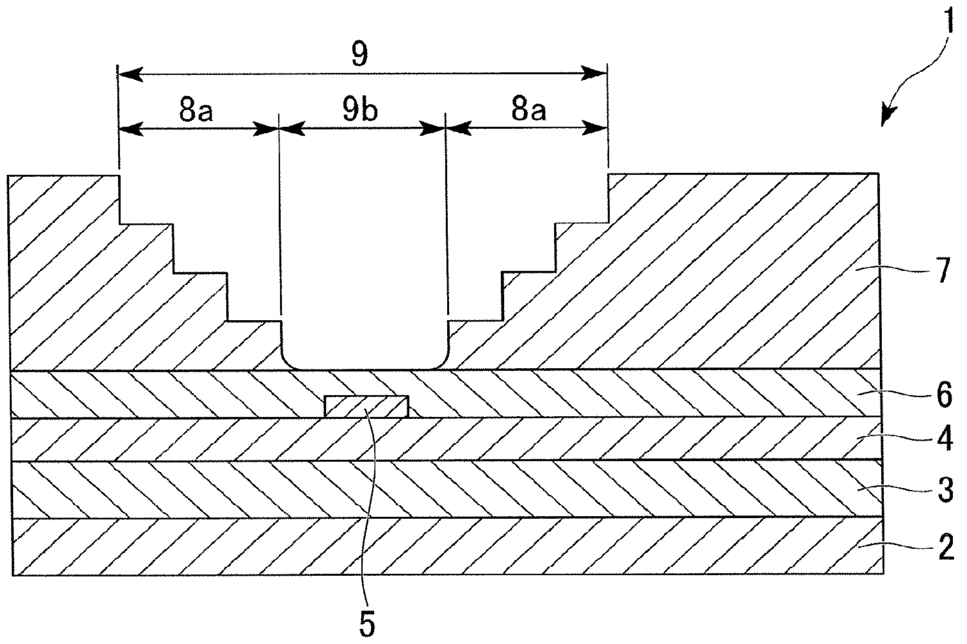
FIG. 1 is a sectional view of a decorative material according to a first embodiment of the present invention.

FIG. 1 shows one embodiment of the present invention. As shown in FIG. 1, the decorative material 1 of this embodiment comprises a substrate 2, a solid print layer 3 that covers the top of the substrate 2, a ground pattern layer 4 provided on the solid print layer 3, a design pattern 5 provided on the ground pattern layer 4 to correspond to an expression region 9 representing recesses or protrusions, a first luster control layer 6 that covers the ground pattern layer 4 and the design pattern 5 and adjusts the state of luster, and a second luster control layer 7 provided on the first luster control layer with a state of luster different from that of the first luster control layer. Now the constitution will be described in detail.

It is possible to use, as the substrate 2, those which are usually used as a stencil paper of a decorative material without any limitation. It is possible to use, as the substrate, conventionally known optional materials, for example, papers such as a tissue paper having a basis weight of about 23 to 100 g/m$^2$, a resin mixed paper, a titanium paper, a resin impregnated paper, a flame-resistant paper, and an inorganic paper; woven or nonwoven fabrics made of a natural fiber or a synthetic fiber; synthetic resin-based substrates comprising a polyolefinic resin such as a homo or random polypropylene resin or a polyethylene resin, a copolyester resin, a crystalline polyester resin in an amorphous state, a polyethylene naphthalate resin, a polybutylene resin, an acrylic resin such as a methyl methacrylate resin or a polymethyl methacrylate resin, a styrenic resin, a polyamide-based resin, a cellulose-based resin, a polycarbonate resin, a polyvinyl chloride resin, a polyvinylidene chloride resin, and a fluorine-based resin; woody substrates such as a wood veneer, a fancy veneer, a plywood, a glued laminated board, a particle board, and a middle density fiber board; inorganic-based substrates such as a gypsum board, a cement board, a calcium silicate board, and a ceramic board; metal-based substrates such as iron, copper, aluminum, and stainless steel; and composites and laminates thereof. Examples of the shape include, but are not limited to, film or sheet, plate and anisotropic-shaped molded article.

The solid print layer 3 is formed of an oil resistant ink. More specifically, as a resin used in the oil resistant ink that forms the solid print layer 3, for example, a two-component curable urethane-based resin or two-component curable acrylic resin having a low hydroxyl value can be used. The resin preferably contains an acrylpolyol resin having a weight average molecular weight of 10,000 or more and 80,000 or less as a binder resin and also contains 10% by weight or more and 75% by weight or less of a pigment. More preferably, the oil resistant ink has a hydroxyl value of 4.0 mg KOH/g or more and 30.0 mg KOH/g or less. When the hydroxyl value is 4.0 mg KOH/g or more, oil resistance can be exhibited more effectively. When the hydroxyl value is 30.0 mg KOH/g or less, the pigment can be satisfactorily dispersed. A sealer layer may be formed between the substrate 2 and the solid print layer 3.

While there is no restriction on the material used to form the ground pattern layer 4 and the design pattern 5 as long as it is an oily ink, generally a printing ink or a coating material constituted from a coloring agent such as a dye or a pigment and a proper vehicle (matrix) dissolved or dispersed in a proper solvent is used.

It is possible to use, as the coloring agent, inorganic pigments such as carbon black, titanium white, zinc white, blood red, chrome yellow, Prussian blue, and cadmium red; organic pigments such as azo pigments, lake pigments, anthraquinone pigments, phthalocyanine pigments, isoindolinone pigments, and dioxazine pigments; or mixtures of two or more kinds thereof.

It is possible to use, as the vehicle, various synthetic resins such as an oil pyroxylin resin, a two-component urethane resin, an acrylic resin, a styrenic resin, a polyester-based resin, a urethane-based resin, a polyvinyl-based resin, an alkyd resin, a petroleum-based resin, a ketone resin, an epoxy-based resin, a melamine-based resin, a fluorine-based resin, a silicone-based resin, a cellulose-based resin, and a rubber-based resin, or mixtures or copolymers thereof.

It is possible to use, as the solvent, toluene, xylene, cyclohexane, ethyl acetate, butyl acetate, methyl alcohol, ethyl alcohol, isopropyl alcohol, acetone, methyl ethyl ketone, methyl isobutyl ketone, cyclohexanone, and water, or mixtures thereof.

And, if necessary, various additives such as extender pigments, plasticizers, dispersing agents, surfactants, tackifiers, bonding auxiliaries, desiccants, curing agents, curing accelerators, and delayed curing agents can be appropriately used.

To form a wood grain pattern, for example, it is a common practice to print the pattern with separate plates that represent the solid background, the wood grain pattern, the vessel pattern, etc. In the decorative material 1 of the present invention, the solid background and the wood grain pattern are provided as the ground pattern layer 4, while the vessel pattern is provided as the design pattern 5 that corresponds to the expression region representing recesses or protrusions. Of course the ground pattern layer 4 of the present invention is not limited to a wood grain pattern, and can be applied to a stone texture, an abstract pattern or the like.

The ground pattern layer 4 and the design pattern 5 are usually formed by a gravure printing method, an offset printing method, a screen printing method, an electrostatic printing method, an inkjet printing method or the like. However, the present invention is not limited to these methods, and the solid background, for example, may be formed by a coating process such as roll coating, knife coating or die coating. Other patterns may also be formed by any known image forming method.

The first luster control layer 6 is formed by using a printing ink or a coating material that is similar to the constituent material used to form the ground pattern layer 4 and the design pattern 5 described above. The first luster control layer 6, however, is required to have transparency or semi-transparency so that at least the ground pattern layer 4 and the design pattern 5 can be seen therethrough, and therefore must be formed from a printing ink or a coating material that does not contain a coloring agent such as a dye or a pigment, or contains only a minimum necessary amount of the coloring agent that does not impair the transparency.

The first luster control layer 6 constitutes the outermost layer of the decorative material 1 in the expression region 9 representing recesses or protrusions as will be described later, and is therefore formed from a material containing a curable resin as the main component so as to provide a surface physical property such as wear resistance, scratch resistance, solvent resistance and stain resistance that are required of the decorative material 1. Specifically, the first luster control layer 6 is formed from a mixture of a curable resin and isocyanate resin with silica particles contained therein. As the curable resin, for example, a thermosetting resin such as a melamine-based resin, an epoxy-based resin, an aminoalkyd-based resin, a urethane-based resin, a polyester-based resin or a silicone-based resin, or an ionizing radiation-curable resin such as an acrylic resin may be preferably used. The silica particles have the effects of improving scratch resistance and providing a matte finish. The state of luster of the first luster control layer 6 can be controlled by containing a predetermined quantity of silica particles as the luster control agent. The content of the silica particles is preferably in a range from 20% to 50% in terms of PWC (pigment weight content). The luster control agent may also include alumina, calcium carbonate, barium sulfate or the like. The ionizing radiation mentioned above refers to a radiation that generally has the effect of ionizing a substance, and includes X-rays, γ-rays, β-rays (electron beam) and short wavelength ultraviolet rays. In this specification, the term "ionizing radiation" is used to include long wavelength ultraviolet rays that do not have an ionizing effect, since an ultraviolet-curable resin that employs a photochemical initiator can be used in the present invention.

The second luster control layer 7 provided on the first luster control layer 6 has a gradation region 8*a* where the state of luster is changed stepwise in the vicinity of the outline of the design pattern 5 except for the portion directly above the design pattern 5, and forms the expression region 9, that represents the visual impression of recesses and protrusions, from a region 8*b* where the first luster control layer 6 is exposed directly above the design pattern 5 and the gradation region 8*a*. The gradation region 8*a* is formed so that the state of luster changes continuously or stepwise, in such a way as the state of luster changes from that of the surface of the expression region 9 that represents recesses or protrusions at a position along the outline of the expression region 9 to the state of luster of a portion except for the vicinity of the design pattern 5 that corresponds to the expression region 9.

The constitution described above will be more specifically described. In order to provide the expression region 9 that represents recesses or protrusions in the form of recesses, the second luster control layer 7 is designed so as to have a higher level of luster than the surface of the expression region 9. Moreover, the second luster control layer 7 is formed with gradation so that the luster of the second luster control layer 7 gradually increases from the outline of the expression region 9 toward the inside of the second luster control layer 7, in the vicinity of the outline of the expression region 9.

In order to provide the expression region 9 representing recesses or protrusions in the form of protrusions, on the other hand, the second luster control layer 7 is designed so as to have a lower level of luster than the surface of the expression region 9. Moreover, the second luster control layer 7 is formed with gradation so that the luster of the second luster control layer 7 gradually decreases from the outline of the expression region 9 toward the inside of the second luster control layer 7, in the vicinity of the outline of the expression region 9. In the case a gravure printing plate is used, use of a laser printing plate in addition to the Porshel method based on etching that uses a film when printing (liable to misalignment due to shrinkage or elongation of the film) and the Heliogl-ascho method leads to a larger volume of the cell of the plate, which makes it possible to represent gradation with higher accuracy because misalignment is less likely to occur in this case even when multiple stage etching is carried out.

The outline of the design pattern 5 that corresponds to the expression region 9 representing recesses or protrusions is not necessarily required to be placed with precise alignment with the stepwise expression region 9, and may be displaced somewhat toward the inside or outside from the outline of the stepwise expression region 9. Rather, visual impression of recesses and protrusions can be adjusted by intentionally displacing the outlines of these regions. Also it is made possible to change the impression of recesses and protrusions from point to point by changing the direction and distance of the displacement between the outlines within the stepwise expression region 9.

The second luster control layer 7 is preferably formed from a material containing a curable resin as the main component, similar to the first luster control layer 6, so as to provide the surface having wear resistance, scratch resistance, solvent resistance and stain resistance that are required of the decorative material, since it constitutes the outermost layer of the decorative material. Specifically, an ionizing radiation-curable monomer that does not increase the viscosity over the course of time during printing is preferably used. This resin does not undergo a curing reaction in the state of liquid being applied at the normal temperature during printing, and therefore viscosity thereof does not increase. When irradiated with an ionizing radiation, the resin rapidly cures and eventually attains full hardness, and provides such an advantage that blocking due to insufficient drying does not occur when the printed matter is wound up or stacked one upon another.

As the ionizing radiation-curable monomer, a compound having an ethylenically unsaturated double bond can be used and includes a monofunctional monomer, a difunctional monomer and a tri- or higher polyfunctional monomer. Usually, the monomer is a nonhydrophilic monomer having no hydrophilicity and has neither of a —CHO group, an —OH group and a —COOH group.

Specific examples of the monofunctional monomer having an ethylenically unsaturated double bond include 2-(2-ethoxyethoxy)ethyl(meth)acrylate, stearyl(meth)acrylate, tetrahydrofurfuryl(meth)acrylate, lauryl(meth)acrylate, 2-phenoxyethyl(meth)acrylate, isodecyl(meth)acrylate, isooctyl(meth)acrylate, tridecyl(meth)acrylate, caprolactone (meth)acrylate, ethoxylated nonylphenol(meth)acrylate, propoxylated nonylphenol(meth)acrylate, phenoxyethyl(meth) acrylate, phenoxydiethylene(meth)acrylate, ethylene oxide modified nonylphenyl(meth)acrylate, methoxytriethylene glycol(meth)acrylate, ethylene oxide 2-ethylhexyl(meth) acrylate, and isobonyl(meth)acrylated diipropylene glycol (meth)acrylate. As used herein, stearyl(meth)acrylate means stearyl acrylate and/or stearyl methacrylate (the same shall apply hereinafter).

Examples of the difunctional monomer include 1,3-butanediol di(meth)acrylate, 1,4-butanediol di(meth)acrylate, polyethylene glycol di(meth)acrylate, polypropylene glycol di(meth)acrylate, neopentyl glycol di(meth)acrylate, propoxylated neopentyl glycol di(meth)acrylate, ethoxylated neopentyl glycol di(meth)acrylate, hydroxypivalic acid neopentyl glycol di(meth)acrylate, (hydrogenated)bisphenol A di(meth)acrylate, (hydrogenated)ethylene oxide modified bisphenol A di(meth)acrylate, (hydrogenated)propylene glycol modified bisphenol A di(meth)acrylate, 1,6-hexanediol di(meth)acrylate, 2-ethyl-2-butyl-propanediol di(meth)acrylate, and 1,9-nonanediol di(meth)acrylate.

Examples of the polyfunctional monomer include tris(2-hydroxyethyl)isocyanurate tri(meth)acrylate, ethoxylated trimethylolpropane tri(meth)acrylate, propoxylated trimethylolpropane tri(meth)acrylate, propoxylated glyceryl tri(meth) acrylate, pentaerythritol tri(meth)acrylate, trimethylolpropane(meth)acrylate, ethylene oxide modified trimethylolpropane(meth)acrylate, propylene oxide modified trimethylolpropane(meth)acrylate, tris(acryloxyethyl)isocyanurate, pentaerythritol tetra(meth)acrylate, ditrimethylolpropane tetra(meth)acrylate, ethoxylated pentaerythritol tetra(meth)acrylate, penta(meth)acrylate ester, and dipentaerythritol hexa(meth)acrylate.

The ionizing radiation-curable monomer is preferably a monomer such as urethane(meth)acrylate, polyester(meth) acrylate, polyether(meth)acrylate, or polyacryl(meth)acrylate because the coated surface may be smooth due to low viscosity and also an anchor effect to the ground pattern layer 4, etc. is improved.

In order to provide the design pattern 5 that corresponds to the expression region 9 representing recesses or protrusions in the form of recesses, it is necessary to form the second luster control layer 7 with a higher level of luster than the surface luster of the first luster control layer 6. In order to provide the design pattern 5 that corresponds to the expression region 9 representing recesses or protrusions in the form of protrusions, on the other hand, it is necessary to form the second luster control layer 7 with a lower level of luster than the surface luster of the first luster control layer 6. The second luster control layer 7 also must have scratch resistance because it forms the outermost layer. For this reason, the second luster control layer 7 contains silica particles for the purpose of adjusting the state of luster of the second luster control layer 7 and improving scratch resistance, similar to the first luster control layer 6. While the content of the silica particles is preferably in a range from 20% to 50% in terms of PWC similarly to the case of the first luster control layer 6, it is controlled so as to provide a state of luster different from that of the first luster control layer 6. The luster control agent may also include alumina, calcium carbonate, barium sulfate or the like, similar to the case of the first luster control layer 6.

To the second luster control layer 7 preferably contains a silicone oil added therein. The silicone oil is added as a stain inhibitor so as to prevent adhesion of stains onto the surface of the second luster control layer 7 and to make it easy to remove adhered stains with various detergents and solvents. The silicone oil is incorporated into a matrix resin composed of an ionizing radiation-curable monomer. It is possible to use, as the silicone oil, a non-modified silicone oil, an amino-modified silicone oil, an epoxy-modified silicone oil, a carboxy-modified silicone oil, a mercapto-modified silicone oil, a carbinol-modified silicone oil, a methacryl-modified silicone oil, and a phenol-modified silicone oil.

It is often advantageous to change the gradation of luster of the second luster control layer 7 in a stepwise manner in terms of a three-dimensional impression of recesses and protrusions as shown in FIG. 1, even when it is intended to represent a continuous change in depth (height). Particularly in such a case as vessel grooves of wood, where continuous gradation is not capable of representing the vivid feeling of the cross section of the three-dimensional touch of the vessel grooves of natural wood despite the very fine recesses and protrusions, stepwise gradation is preferably employed.

The state of luster of the second luster control layer 7 is provided in gradation by, for example, a gravure printing method, while changing the plate depth or area ratio of the gravure printing plate so as to achieve the desired gradation. In addition, an ordinary offset printing method, a screen printing method, an electrostatic printing method, an inkjet printing method or the like may also be employed.

The gradation is not limited to that achieved by varying the amount of resin applied to form the second luster control layer 7, and may be achieved by varying the area ratio of dots (not shown) or by combining the variation of the amount of applied resin and the variation of area ratio (not shown).

However, even a pattern designed as dots of the printing plate usually becomes somewhat continuous due to the fluidity of the resin during the printing process, and therefore the difference described above is not essential. While the drawing shows the case of stepwise variation for sake of simplicity as shown in FIG. 1, all of the various techniques of producing the gradation are included.

In order to provide the expression region 9 that represents recesses or protrusions in the form of recesses, the surface of the expression region 9 representing recesses or protrusions must have a low level of luster. For this purpose, in the case the ground pattern layer 4 that corresponds to expression region 9 representing recesses or protrusions is exposed on the surface of the expression region 9 as shown in FIG. 1, it is necessary to add a luster control agent to the printing ink used to form the ground pattern layer 4 so as to control the state of luster to a low level. In contrast, in order to provide the expression region 9 representing recesses or protrusions in the form of protrusions, it is necessary to use a printing ink that provides higher luster to the surface after printing for the printing ink used to form the design pattern 5 that corresponds to the expression region 9.

Now the subject of the positional relationship between the expression region 9 representing recesses or protrusions and the ground pattern layer 4 that corresponds to expression region 9 will be described again. In order to represent recesses or protrusions having a color different from that of the other portion only at the bottom of the recess or the top of the protrusion, it is necessary to form the ground pattern layer 4 with the same outline as the expression region 9. In order to represent recesses or protrusions having the same color as that of the bottom or the top also on the slope on the outline of recesses or protrusions, it is preferable to form the ground pattern layer 4 in a region where the second luster control layer 7 extends to the outline of a region that has the gradation of the outside of the expression region 9. For example, the latter constitution is recommended in the case it is aimed to imitate the vessel grooves in the cross section of natural wood.

In order to represent the state of color changing continuously on the slope on the outline of recesses or protrusions, gradation may be given to the color of the ground pattern layer 4 in the region where the second luster control layer 7 in the vicinity of the outline of the expression region 9 has gradation. Alternatively, a similar visual effect of representation can be achieved also by positioning the outline of the ground pattern layer 4 at a mid point between the inner and outer outlines of the region where the second luster control layer has gradation. In addition, the various representation techniques may be combined in accordance to the position, so as to represent a complicated configuration of recesses and protrusions where impression of recesses and protrusions changes with the position.

Figure 2:
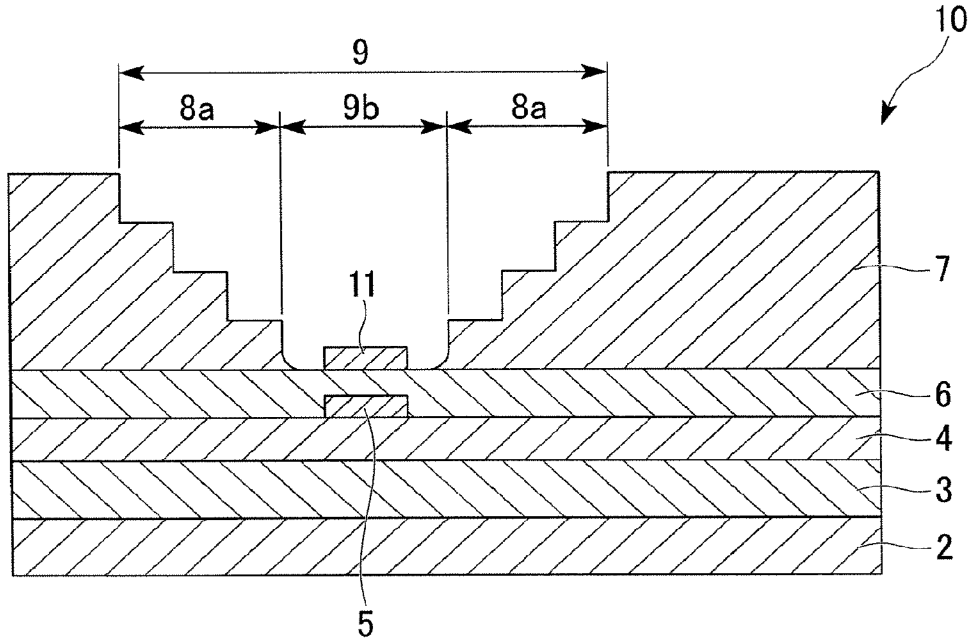
FIG. 2 is a sectional view of a decorative material according to a second embodiment of the present invention.

Also as in the case of a decorative material 10 shown in FIG. 2, a surface pattern 11 may be formed from the oil resistant ink on the first luster control layer 6, at a position directly above the design pattern 5 that corresponds to the expression region 9 representing recesses or protrusions. The oil resistant ink used to form the surface pattern 11 is similar to the oil resistant ink used to form the solid print layer 3. By providing the surface pattern 11 in this way, it is made possible to provide a design that can be visually recognized as a color pattern independent of the recesses and protrusions given by the gradation region 8*a*. It is also possible to prevent an oily substance from infiltrating into the area where the second luster control layer 7 is removed, by forming the surface pattern 11 from the oil resistant ink.

Representation of the vessel grooves of natural wood, as mentioned previously, is the most typical application of the decorative material 1, 10 of the present invention shown in FIG. 1 or FIG. 2. Since the vessel grooves are a physically recessed configuration, such a constitution is employed as the portion of vessel pattern is formed with a low level of luster on the surface and the second luster control layer 7 having a high level of luster is formed on the surface except for the portion of vessel pattern. However, to represent such a type of wood that has pale color and vessel grooves looking as if standing out as in the case of a certain kind of conifer wood, realistic impression can be obtained by reversing the relationship of high and low luster levels described above. Such a reversal of the relationship of high and low luster levels may sometimes produce an original and novel representation of the vessels not relevant to the preconception.

The decorative materials 1 and 10 have the second luster control layer 7 provided with gradation in the state of luster formed on the surface thereof, and are therefore capable of representing recesses and protrusions with continuously changing depth (height) as the vessels of natural wood. Moreover, representation of recesses and protrusions by means of luster can be made clearer by forming the second luster control layer 7 with a higher level of luster and forming the first luster control layer 6 with a lower level of luster so as to cover the design pattern 5. Furthermore, stress generated as the resin that forms the second luster control layer 7 cures is mitigated by the first luster control layer 6, so as to suppress the design pattern 5 and the ground pattern layer 4 from peeling off. As a result, a design having better three-dimensional expression, that is achieved by the ground pattern layer 4 formed over the entire surface and the design pattern 5 that represents the recesses or protrusions which are partially provided, can be maintained satisfactorily. Also because the substrate 2 is covered by the solid print layer 3 formed from the oil resistant ink, even when an oily substance infiltrates into the second luster control layer 7 and the first luster control layer 6 that have luster controlled by means of the silica particles, the oily substance is prevented from infiltrating into the substrate 2, thus making it possible to prevent ply separation and impairment of the appearance from taking place.

The present invention is not limited to the embodiments described above, and various modifications may be made without departing from the scope of the present invention. For example, it is assumed in the embodiments described above, that the state of luster of the second luster control layer 7 is constant in portions other than in the vicinity of the expression region 9 that represent recesses or protrusions. However, the state of luster of the second luster control layer 7 may be varied in sync with the wood grain pattern, in order to represent the difference in luster between a spring-grown portion and an autumn-grown portion of natural wood, or to represent the difference in luster due to the angle between the cut surface and the direction of the wood grain pattern. This makes it possible to produce a decorative material having very high design quality that mimics natural wood more accurately, in addition to the accurate expression of the configuration of the vessel grooves described previously.

Now the decorative materials 1 and 10 of the first and second embodiments will be described in detail by way of Examples 1 and 2.

EXAMPLE 1

The decorative material 1 shown in FIG. 1 was made by the following process.

An impregnated paper (GFR-506 manufactured by KOHJIN Co., Ltd.) weighing 50 g/m$^2$ prepared for the substrate 2 was coated on the surface with a resin prepared by mixing 100 parts by weight of a two-component curable acrylic resin (acrylpolyol resin (weight average molecular weight: 50,000, hydroxyl value: 8.3 mg KOH/g) as a binder resin containing 45.0% by weight of a pigment) and 5 parts by weight of an isocyanate curing agent (「G-28N」 manufactured by DAINIPPON INK AND CHEMICALS, INCORPORATED), thereby forming the solid print layer 3 from the oil resistant ink with the quantity of application controlled to achieve a dry density of 2 g/m$^2$.

On the surface of the solid print layer that had been dried, the ground pattern layer 4 was printed in a single color by using a pyroxylin resin-based gravure printing ink (each color of 「PCNT, PCRNT」 manufactured by TOYO INK MFG. Co., Ltd.), and a wood grain pattern was further printed thereon. A vessel pattern (number of lines 150) was printed in sync therewith as the design pattern 5 corresponding to the expression region representing recesses or protrusions.

Then the ground pattern layer 4 and the design pattern 5 were covered by the first luster control layer 6 formed from a mixture of 100 parts by weight of an ultraviolet-curable resin (「YU660 Hi-matte」 manufactured by TOYO INK MFG. Co., Ltd.) and 12 parts by weight of a curing agent (「UR130B varnish」 manufactured by TOYO INK MFG. Co., Ltd.) with an isocyanate curing agent added and 30.0% in PCW of silica powder added so as to control the luster level lower, with the quantity of application controlled to achieve a dry density of 5 g/$m^2$.

Then the second luster control layer 7 was formed by printing an ultraviolet-curable resin (50 parts by weight of YU656UV Gloss and 50 parts by weight of YU656UV Matte manufactured by TOYO INK MFG. Co., Ltd.) prepared so that the level of luster becomes higher due to the difference in the content of silica powder, on the surface excluding the portion of vessel pattern with gradation in the vicinity of the outline of the vessel pattern (number of lines 100), so that the dry density would be 2 g/$m^2$. The ultraviolet-curable resin was cured by irradiating with ultraviolet ray in air using two high pressure mercury lamps with output power of 80 W/cm and 120 W/cm disposed at a distance of 240 mm between the center of the lamp and the paper, scanning at a speed of 50 m per minute. Then the paper was wound up to obtain the decorative material 1 of the present invention. No blocking occurred while winding.

EXAMPLE 2

A decorative material was made same to Example 1 except for forming the surface pattern 11 from an oil resistant ink same to that of Example 1. No blocking occurred while winding.

COMPARATIVE EXAMPLE 1

A decorative material having a constitution same to that of Example 1 was made except for lacking the solid print layer 3 formed from the oil resistant ink of Example 1.

The decorative materials of Examples 1 and 2 and Comparative Example 1 prepared as described above were laminated onto wooden substrates by means of a urea resin adhesive. Paraffin oil (Paraffin Oil 294365H BDH chemical Poole, U.K.) was dripped onto these test pieces that were then covered with watch glasses for 24 hours. When the portion whereon the paraffin oil was dripped was visually observed, infiltration of the paraffin oil was not observed on the decorative materials of Examples 1 and 2. The decorative material of Comparative Example 1, in contrast, showed conspicuous infiltration of the paraffin oil. This is considered to be because the decorative material of Comparative Examples 1 lacked the solid print layer 3 formed from oil resistant ink and therefore allowed the oily substance to infiltrate from the surface down to the substrate and stay therein.

Preferable examples of the present invention have been described. It is understood, however, that the present invention is not limited to these examples. Additions, omissions, substitutions, and other modifications can be made without departing from the spirit or scope of the present invention. Accordingly, the invention is not to be considered as limited by the foregoing description but is only limited by the scope of the appended claims.

INDUSTRIAL APPLICABILITY

The decorative material of the present invention provides a three-dimensional impression of recesses and protrusions by the difference in the level of surface luster, and can be used to provide an aesthetic effect on the surface of the interior and/or exterior of a building, joinery, furniture, etc.

What is claimed is:

1. A decorative material comprising:

a substrate;

a solid print layer that is formed from an oil resistant ink containing an acrylpolyol resin having a weight average molecular weight in the range from 10,000 to 80,000 and a hydroxyl value of 4.0 mg KOH/g or more and 30.0 mg KOH/g or less as a binder resin, and 10% by weight to 75% by weight of a pigment, and is provided on the surface of the substrate;

a ground pattern layer provided on the solid print layer;

a design pattern provided on the upper layer side of the ground pattern layer to correspond to an expression region that represents recesses or protrusions;

a first luster control layer that is formed from a mixture of a curable resin and an isocyanate resin with silica particles contained therein, and covers the design pattern and a lower layer of the design pattern; and a second luster control layer that contains silica particles and is provided on the first luster control layer with a state of luster different from that of the first luster control layer, while having a gradation region where the state of luster is changed stepwise in a vicinity of an outline of the design pattern except for a portion directly above the design pattern.

2. The decorative material according to claim 1, which has a surface pattern formed from the oil resistant ink directly above the design pattern on the first luster control layer.

* * * * *